United States Patent
Linemann et al.

(10) Patent No.: US 6,706,851 B1
(45) Date of Patent: Mar. 16, 2004

(54) POLYETHERESTERAMIDES AND COMPOSITIONS OF ANTISTATIC POLYMERS CONTAINING THE SAME

(75) Inventors: Reinhard Linemann, Bernay (FR); Thierry Briffaud, Bernay (FR); Hermann Hilgers, Le Tilleul Othon (FR); Christophe Lacroix, Harquency (FR)

(73) Assignee: Atofina, Puteaux (FR)

( * ) Notice: Subject to any disclaimer, the term of this patent is extended or adjusted under 35 U.S.C. 154(b) by 112 days.

(21) Appl. No.: 09/868,099
(22) PCT Filed: Oct. 17, 2000
(86) PCT No.: PCT/FR00/02889
§ 371 (c)(1), (2), (4) Date: Jun. 14, 2001
(87) PCT Pub. No.: WO01/29113
PCT Pub. Date: Apr. 26, 2001

(30) Foreign Application Priority Data

Oct. 18, 1999 (FR) .............................................. 99 12956

(51) Int. Cl.$^7$ .............................................. C08G 63/00
(52) U.S. Cl. ........................... 528/271; 525/66; 525/92; 525/166; 525/167; 525/434; 528/272
(58) Field of Search ........................... 525/66, 92, 166, 525/167, 434; 528/271, 272

(56) References Cited

U.S. PATENT DOCUMENTS 5,886,098 A 3/1999 Ichihara et al.

FOREIGN PATENT DOCUMENTS

JP 05140541 6/1993

OTHER PUBLICATIONS

Derwent WPI JP05 140541 (Jun. 8, 1993).

*Primary Examiner*—Terressa Boykin
(74) *Attorney, Agent, or Firm*—Millen, White, Zelano & Brangian, P.C.

(57) ABSTRACT

The present invention relates to polyetheresteramides (B) containing polyamide blocks comprising dicarboxylic acid sulphonates either as polyamide-block chain limiters or combined with a diamine as one of the constituent monomers of the polyamide block, and containing polyether blocks consisting essentially of alkylene oxide units.

The invention also relates to polyetheresteramides (B) containing polyamide blocks of the polyamide oligomer type of low molecular mass or of the copolyamide type which comprise dicarboxylic acid sulphonates and containing polyether blocks which are adducts of alkylene oxide with an aromatic diol.

The invention also relates to antistatic or breathable polymer compositions comprising a thermoplastic polymer (A) and at least one of the above polyetheresteramides (B).

12 Claims, No Drawings

POLYETHERESTERAMIDES AND COMPOSITIONS OF ANTISTATIC POLYMERS CONTAINING THE SAME

FIELD OF THE INVENTION

The present invention relates to polyetheresteramides (B) containing in their chain elements bearing sulphonate groups. Polyetheresteramides (B) are copolymers obtained from the condensation of polyamide blocks containing carboxylic chain ends with polyetherdiol blocks essentially comprising alkylene oxide units and preferably ethylene oxide —($C_2H_4$—O)— units. The incorporation of elements bearing sulphonate groups into the polyetheresteramide chain improves its intrinsic antistatic properties.

The present invention also relates to the addition of these polyetheresteramides (B) to thermoplastic polymers (A) to make them antistatic.

It is concerned with giving the thermoplastic polymer (A) antistatic properties. The formation and retention of static electricity charges at the surface of most plastics are known. The presence of static electricity on thermoplastic films leads, for example, to these films sticking together, making them difficult to separate. The presence of static electricity on wrapping films can cause the accumulation of dusts on the objects to be wrapped and thus inconvenience their use. Static electricity can also damage microprocessors or constituents of electronic circuits. Static electricity can also cause the combustion or explosion of flammable materials such as, for example, expandable polystyrene beads containing pentane.

The prior art discloses antistatic agents such as ionic surfactants of the sulphonate or ethoxylated amine type which are added to polymers. However, the antistatic properties of the polymers depend on the ambient humidity and they are not permanent since these agents migrate to the surface of the polymers and disappear. Copolymers containing polyamide blocks and hydrophilic polyether blocks have thus been proposed as antistatic agents, these agents having the advantage of not migrating and thus of giving permanent antistatic properties that are more independent of the ambient humidity.

THE PRIOR ART

U.S. Pat. No. 3,296,204 discloses linear polyamide fibres obtained by reacting 5-sulphoisophthalic acid with a diamine followed by polycondensation with an amino acid or a salt of diamine and diacid such as hexamethylene adipate. These fibres have good dyeing ability and absorb humidity like natural fibres. They are not polyetheresteramides.

Patent application JP 11 029 685 A published on Feb. 2, 1999 discloses antistatic acrylic resins containing polyetheresters obtained by condensation of polyoxyalkylene glycol and of dicarboxylic acids. Some of these diacids contain sulphonic groups. These polyetheresters are not polyetheresteramides.

Patent application JP 08 208 830 A published on Aug. 13, 1996 discloses hydrophilic elastomers containing 5-sulphoisophthalic salts and adducts of ethylene oxide with an aromatic diol. The polyetheresteramides are not clearly described. There is no description of blocks consisting of copolyamide or of polyamide oligomers of low molecular masses.

U.S. Pat. No. 5,096,995 discloses polyetheresteramides containing two types of polyether blocks, that is to say polyether blocks of the polyethylene glycol type and blocks that are adducts of ethylene oxide with an aromatic diol. The chain limiter for the polyamide blocks is a dicarboxylic acid; mention is made of diacids bearing a sulphonate group, such as the sodium salt of 3-sulphoisophthalic acid, and unsubstituted diacids, but it is preferred to use unsubstituted acids such as terephthalic acid, isophthalic acid, 1,4-cyclohexanedicarboxylic acid, sebacic acid, adipic acid or decanedicarboxylic acid. None of the examples uses diacids bearing sulphonate groups. The polyamide blocks disclosed in the examples consist of caprolactam or lauryllactam; copolyamides and polyamide oligomers of low molecular masses are not described.

Patent application JP 05 140 541 A published on Jun. 8, 1993 discloses polyetheresteramides containing polyamide blocks, formed by the condensation of caprolactam in the presence of the sodium salt of 3-sulphoisophthalic acid, and polyether blocks which are adducts of ethylene oxide with bisphenol A. There is no description of blocks consisting of copolyamide or of polyamide oligomers of low molecular masses.

Patent EP 613 919 discloses polyetheresteramides containing polyether blocks which are adducts of ethylene oxide with bisphenol A. The chain limiter for the polyamide blocks is a dicarboxylic acid; mention is made of diacids bearing a sulphonate group, such as the sodium salt of 3-sulphoisophthalic acid, and unsubstituted diacids such as terephthalic acid, isophthalic acid, sebacic acid, adipic acid and decanedicarboxylic acid. None of the examples uses diacids bearing sulphonate groups. Furthermore, the specific advantage provided by the incorporation of ionic groups, such as the sulphonate groups, into the polyetheresteramide chain to improve the antistatic properties is not described. As shown in the said patent, the use of a bisphenol-A adduct plays a heat-stabilizing role. On the other hand, the intrinsic antistatic properties of the product are not improved. The polyamide blocks disclosed in the examples consist of caprolactam; copolyamides are not described. These polyetheresteramides are added to various thermoplastic polymers to make them antistatic, but it is also necessary to add salts chosen from alkali metal halides or alkaline-earth metal halides.

According to a first form of the invention, the Applicant has now found novel polyetheresteramides containing polyamide blocks comprising dicarboxylic acid sulphonates, either as polyamide-block chain limiters or combined with a diamine as one of the constituent monomers of the polyamide block. The polyether blocks consist essentially of alkylene oxide units, preferably ethylene oxide units, but do not comprise aromatic diols, i.e. it is advantageously polyethylene glycol. These polyetheresteramides of very simple structure have very good antistatic properties as well as good heat stability.

According to a second form of the invention, the Applicant has found novel polyetheresteramides containing polyamide blocks of the polyamide oligomer type of low molecular masses, or of the copolyamide type which comprise dicarboxylic acid sulphonates and whose polyether blocks are adducts of alkylene oxide, preferably ethylene oxide, with an aromatic diol. This combination is particularly advantageous for improving the thermal behaviour.

According to a third form of the invention, the Applicant has found that the polyetheresteramides of the first and second forms of the invention are particularly useful for making a thermoplastic polymer (A) antistatic.

BRIEF DESCRIPTION OF THE INVENTION

According to a first form, the present invention relates to polyetheresteramides (B) containing polyamide blocks comprising dicarboxylic acid sulphonates either as chain limiters for the polyamide block or combined with a diamine as one of the constituent monomers of the polyamide block, and containing polyether blocks consisting essentially of alkylene oxide units.

According to a second form, the present invention relates to polyetheresteramides (B) containing polyamide blocks of the polyamide oligomer type of low molecular masses, or of the copolyamide type comprising dicarboxylic acid sulphonates, and containing polyether blocks which are adducts of alkylene oxide with an aromatic diol.

According to a third form, the present invention relates to antistatic or breathable polymer compositions comprising a thermoplastic polymer (A) and at least one polyetheresteramide (B) according to one of the above forms.

DETAILED DESCRIPTION OF THE INVENTION

The dicarboxylic acid sulphonates are ammonium or alkali metal salts of aromatic diacids. They are, for example, sodium, potassium, lithium and ammonium salts of 2-sulphoisophthalic acid, 4-sulphoisophthalic acid, 5-sulphoisophthalic acid (3-sulphoisophthalic acid), 2-sulphoterephthalic acid, 2,6-dicarboxynaphthalene-4-sulphonic acid, 2,7-dicarboxynaphthalene-4-sulphonic acid and diphenylsulphoterephthalic acid and/or alkyl esters thereof.

The polyetheresteramides (B) are polymers containing polyamide blocks and polyether blocks which result from the copolycondensation of dicarboxylic polyamide sequences (containing carboxylic chain ends) with polyetherdiols.

The polyamide sequences containing dicarboxylic chain ends are obtained, for example, from the condensation of α,ω-aminocarboxylic acids, lactams or dicarboxylic acids and diamines in the presence of a chain-limiting dicarboxylic acid.

The number-average molar mass $\overline{M}n$ of the polyamide sequences is between 300 and 15000 and preferably between 400 and 5000. The mass $\overline{M}n$ of the polyether sequences is between 100 and 6000 and preferably between 200 and 3000.

The polymers containing polyamide blocks and polyether blocks can also comprise randomly-distributed units. These polymers can be prepared by simultaneously reacting the polyether and precursors of the polyamide blocks.

For example, polyetherdiol, a lactam (or an α,ω-amino acid) and a chain-limiting diacid can be reacted in the presence of a small amount of water. A polymer essentially containing polyether blocks, polyamide blocks of very variable length, and also the various reagents which have reacted randomly and which are distributed randomly along the polymer chain, is obtained.

These polymers containing polyamide blocks and polyether blocks, whether they are obtained from the copolycondensation of polyamide and polyether sequences prepared beforehand or from a one-step reaction, have, for example, an inherent viscosity of between 0.4 and 2.5 measured in meta-cresol at 25° C. for an initial concentration of 0.5 g/100 ml.

Polymers containing polyamide and polyether blocks are described in U.S. Pat. Nos. 4,331,786, 4,115,475, 4,195,015, 4,839,441, 4,864,014, 4,230,838 and 4,332,920.

Three types of polyetheresteramides of this first form of the invention will now be described, these types differing by the nature of the polyamide blocks.

According to a first type, the polyamide sequences containing dicarboxylic chain ends are obtained from the condensation either of α,ω-aminocarboxylic acids or from lactams or from dicarboxylic acids and diamines in the presence of a chain-limiting dicarboxylic acid. If the polyamide block is formed by reaction of a diacid and a diamine, the chain limiter can be the diacid used in excess or another diacid. According to the present invention, the excess dicarboxylic acid used as chain limiter or the dicarboxylic acid used as chain limiter is, totally or partly, a dicarboxylic acid sulphonate. An example of an α,ω-aminocarboxylic acid which may be mentioned is aminoundecanoic acid, examples of lactams which may be mentioned are caprolactam and lauryllactam, examples of dicarboxylic acids which may be mentioned are adipic acid, decanedioic acid and dodecanedioic acid, and an example of a diamine which may be mentioned is hexamethylenediamine. The polyamide blocks are made of nylon-12, nylons or nylon-6,6 and preferably PA-6 or PA-12, and the limiter is NaSIP (sodium salt of 5-sulphoisophthalic acid). The melting point of these polyamide sequences, which is also that of the copolymer (B), is generally 10 to 15° C. below that of the PA-12 or PA-6.

Depending on the nature of (A), it may be useful to use a polyetheresteramide (B) which has a lower melting point so as not to degrade (A) during the incorporation of (B), and this forms the subject of the second and third types of polyetheresteramide below.

According to a second type, the polyamide sequences are oligomers which result from the condensation of one or more α,ω-aminocarboxylic acids and/or of one or more lactams containing from 6 to 12 carbon atoms in the presence of a dicarboxylic acid sulphonate and optionally of a dicarboxylic acid containing from 4 to 12 carbon atoms, and are of low molecular mass, i.e. $\overline{M}n$ of 400 to 900. In other words, the chain limiter is totally or partially a dicarboxylic acid sulphonate. Examples of α,ωaminocarboxylic acid which may be mentioned are aminoundecanoic acid and aminododecanoic acid. Examples of dicarboxylic acids containing from 6 to 12 carbon atoms which may be mentioned are adipic acid, sebacic acid, isophthalic acid, butanedioic acid, 1,4-cyclohexyldicarboxylic acid, terephthalic acid, dimerized fatty acids (these dimerized fatty acids have a dimer content of at least 98% and are preferably hydrogenated) and dodecanedioic acid. Examples of lactams which may be mentioned are caprolactam and lauryllactam. Polyamide sequences obtained by condensation of lauryllactam in the presence of NaSIP and with an $\overline{M}n$ of 750 have a melting point of 127–130° C.

According to a third type, the polyamide sequences result from the condensation of at least one α,ω-aminocarboxylic acid (or a lactam), at least one diamine and at least one dicarboxylic acid. As for the first type, the chain limiter may be an excess of the dicarboxylic acid or another dicarboxylic acid, all or some of the chain limiter being replaced with a dicarboxylic acid sulphonate. According to one variant of this third type, the amount of dicarboxylic acid sulphonate can be greater than the amount required as chain limiter and can even replace all or some of the dicarboxylic acids used in combination with the diamine to constitute the polyamide block of this third type. The α,ωaminocarboxylic acid, the lactam and the dicarboxylic acid can be chosen from those mentioned above.

The diamine can be an aliphatic diamine containing from 6 to 12 carbon atoms, and may be an arylic and/or saturated cyclic diamine.

Examples which may be mentioned are hexamethylenediamine, piperazine, 1-aminoethylpiperazine, bisaminopropylpiperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4aminocyclohexyl)methane (BMACM).

In the second and third types of polyamide blocks, the various constituents of the polyamide sequence and their proportion are chosen so as to obtain a melting point of less than 150° C. and advantageously between 90 and 135° C. Low-melting copolyamides are described in U.S. Pat. No. 4,483,975, DE 3 730 504 and U.S. Pat. No. 5,459,230, and the same proportions of the constituents are used for the polyamide blocks of (B). (B) can also be the copolymers described in U.S. Pat. No. 5,489,667.

The polyether blocks can represent 5 to 85% by weight of (B) and advantageously 15 to 50%. The blocks consist of one or more alkylene oxide units distributed in an ordered or random manner or can consist of a mixture of these compounds. Alkylene oxides which may be mentioned are ethylene oxide, propylene oxide and tetrahydrofuran. Essentially ethylene oxide is advantageously used. It is possible, for example, to use PEG blocks, i.e. blocks consisting of ethylene oxide units, PPG blocks, i.e. blocks consisting of propylene oxide units, and PTMG blocks, i.e. blocks consisting of tetramethylene glycol units, also known as polytetrahydrofuran units.

As regards the second form of the invention, the polyetheresteramides have the same polyamide blocks as the polyetheresteramides of the second and third type of the first form. In this second form the polyether blocks are adducts of alkylene oxide with an aromatic diol.

Examples of aromatic diols which may be mentioned are the products of formula (1) below:

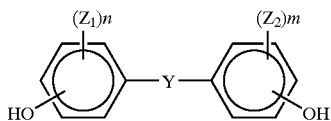

in which:
Z$_1$ and Z$_2$ are chosen from alkyl groups containing from 1 to 4 carbon atoms, aralkyl groups containing from 6 to 10 carbon atoms, aryl groups and halogens; Z$_1$ and Z$_2$ may be identical or different;
Y is a covalent bond, an alkylidene group, an arylalkylidene group, an oxygen atom, a sulphur atom, a sulphonyl group, a bistrifluoromethylmethylene group or a carbonyl group;
n and m are integers from 0 to 4.

These compounds are bisphenols; examples which may be mentioned are dihydroxydiphenyl, bisphenol substituted with alkyls, halogenated bisphenols, alkylene bisphenols such as bisphenol F, alkylidene bisphenols such as bisphenol A, cyclohexylidene bisphenol, bistrifluoromethylmethylene bisphenol, arylalkylidene bisphenol, bisphenol S and hydroxybenzophenone. Bisphenol A is preferred.

The polyetheresteramides according to the first and second form of the invention can be prepared by any means for attaching the polyamide blocks and polyether blocks. In practice, essentially two processes are used, one referred to as a 2-step process, the other a one-step process. In the description of the processes, the general expressions "chain-limiter" and "polyamide precursor" are used without specifying their exact nature, given that they have been described earlier in the description of the polyetheresteramides.

The 2-step process consists firstly in preparing the polyamide blocks containing carboxylic ends by condensation of the polyamide precursors in the presence of a chain-limiting dicarboxylic acid, and then, in a second step, in adding the polyether and a catalyst. The reaction usually takes place between 180 and 300° C., preferably 200 to 260° C., for about 2 hours. The pressure in the reactor can be established, for example, between 5 and 30 bar. The pressure is reduced slowly by opening the reactor to the atmosphere, and the excess water is then distilled off, for example over one or two hours.

Once the polyamide containing carboxylic acid ends has been prepared, the polyether and a catalyst are then added. The polyether can be added in one or more portions, as can, the catalyst. According to one advantageous form, the polyether is first added, and the reaction of the OH ends of the polyether and of the COOH ends of the polyamide begins with formation of ester bonds and removal of water. As much water as possible is removed from the reaction medium by distillation, and the catalyst is then introduced to complete the linking of the polyamide blocks and polyether blocks. This second step is carried out with stirring, preferably under a vacuum of at least 5 mm Hg (650 Pa) at a temperature such that the reagents and the copolymers obtained are in molten form. By way of example, this temperature can be between 100 and 400° C. and usually between 200 and 300° C. The reaction is followed by measuring the torsional couple exerted by the molten polymer on the stirrer or by measuring the electrical power consumed by the stirrer. The end of the reaction is determined by the value of the couple or of the target power. The catalyst is defined as being any product which facilitates the linking of the polyamide blocks and polyether blocks by esterification. The catalyst is advantageously a derivative of a metal (M) chosen from the group formed by titanium, zirconium and hafnium.

Examples of derivatives which may be mentioned are tetraalkoxides corresponding to the general formula M(OR)$_4$, in which M represents titanium, zirconium or hafnium and the radicals R, which may be identical or different, denote linear or branched alkyl radicals containing from 1 to 24 carbon atoms.

The C$_1$ to C$_{24}$ alkyl radicals, from which the radicals R in the tetraalkoxides used as catalysts in the process according to the invention are chosen, are, for example, alkyl radicals such as methyl, ethyl, propyl, isopropyl, butyl, ethylhexyl, decyl, dodecyl or hexadodecyl. The preferred catalysts are the tetraalkoxides for which the radicals R, which may be identical or different, are C$_1$ to C$_8$ alkyl radicals. Examples of such catalysts are, in particular, Z$_r$(OC$_2$H$_5$)$_4$, Z$_r$(O-isoC$_3$H$_7$)$_4$, Z$_r$(OC$_4$H$_9$)$_4$, Z$_r$(OC$_5$H$_{11}$)$_4$, Z$_r$(OC$_6$H$_{13}$)$_4$, H$_f$(OC$_2$H$_5$)$_4$, H$_f$(OC$_4$H$_9$)$_4$ and H$_f$(O-isoC$_3$H$_7$)$_4$.

The catalyst used in this process according to the invention can consist solely of one or more of the tetraalkoxides of formula M(OR)$_4$ defined above. It can also be formed by the combination of one or more of these tetraalkoxides with one or more alkali metal alkoxides or alkaline-earth metal alkoxides of formula (R$_1$O)$_p$Y in which R$_1$ denotes a hydrocarbon-based residue, advantageously a C$_1$ to C$_{24}$ and preferably C$_1$ to C$_8$ alkyl residue, Y represents an alkali metal or alkaline earth metal and p is the valency of Y. The amounts of alkali metal or alkaline-earth metal alkoxide and of zirconium or hafnium tetraalkoxides which are combined to constitute the mixed catalyst can vary within a wide range. However, it is preferred to use amounts of alkoxide and of tetraalkoxides such that the molar proportion of alkoxide is substantially equal to the molar proportion of tetraalkoxide.

The weight proportion of catalyst, i.e. of the tetraalkoxide (s) when the catalyst contains no alkali metal or alkaline-earth metal alkoxide, or alternatively of all of the tetraalkoxide(s) and of the alkali metal or alkaline-earth metal alkoxide(s) when the catalyst is formed by a combination of these two types of compounds, advantageously ranges from 0.01 to 5% relative to the weight of the mixture of the dicarboxylic polyamide with the polyoxyalkylene glycol, and is preferably between 0.05 and 2% relative to this weight.

Examples of other derivatives which may also be mentioned are salts of the metal (M), in particular salts of (M) and of an organic acid, and complex salts between the oxide of (M) and/or the hydroxide of (M) and an organic acid. The organic acid may advantageously be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic acid and propionic acid are particularly preferred. M is advantageously zirconium. These salts can be referred to as zirconyl salts. Without being bound by this explanation, the Applicant believes that these salts of zirconium and of an organic acid or the complex salts mentioned above release $ZrO^{++}$ during the process. The product sold under the name zirconyl acetate is used. The amount to be used is the same as for the derivatives $M(OR)_4$.

This process and these catalysts are described in U.S. Pat. Nos. 4,332,920, 4,230,838, 4,331,786, 4,252,920, JP 07 145 368 A, JP 06 287 547 A and EP 613 919.

As regards the one-step process, all the reagents used in the two-step process, i.e. the polyamide precursors, the chain-limiting dicarboxylic acid, the polyether and the catalyst, are mixed together. These are the same reagents and the same catalyst as in the two-step process described above.

The reactor is closed and heated with stirring as in the first step of the two-step process described above. The reaction is continued as above for the two-step process.

The catalyst used in the one-step process is preferably a salt of the metal (M) and of an organic acid, or a complex salt between the oxide of (M) and/or the hydroxide of (M) and an organic acid.

As regards the third form of the invention, examples of polymers (A) which may be mentioned are polyolefins, polyamides, fluorinated polymers, saturated polyesters, polycarbonate, styrene resins, PMMA, thermoplastic polyurethanes (TPU), PVC, copolymers of ethylene and of vinyl acetate (EVA), copolymers of ethylene and of an alkyl(meth) acrylate, ABS, SAN, polyacetal and polyketones. For the purposes of the invention, the polyolefins also denote copolymers of ethylene and of an α-olefin. It would not constitute a departure from the context of the invention to use a mixture of two or more polymers (A).

As regards the proportions of (A) and (B), the amount of (B) depends on the level of antistatic nature required and on the proportion of polyether in (B). The proportion of (A) and (B) ranges from 2 to 40 parts of (B) per 98 to 60 parts of (A), and advantageously 2 to 20 parts of (B) are used per 98 to 80 parts of (A).

The compositions according to the invention can also contain at least one additive chosen from:

fillers (minerals, flame retardants, etc.);

fibres mineral salts and/or organic salts and/or polyelectrolyte salts;

dyes;

pigments;

optical brighteners;

antioxidants

UV stabilizers.

The compositions of the invention are prepared by the usual techniques for thermoplastics, such as, for example, by extrusion or using twin-screw mixers.

EXAMPLES

Polyetheresteramides were prepared according to the processes described above. The details are given in Table 1 below.

TABLE 1

Composition and resistivity of Examples 1–5 bis polyetheresteramide limited with NaSIP

| Example | 1 (comparative) | 2 (comparative) | 3 | 4 | 5 | 5 bis |
|---|---|---|---|---|---|---|
| Block-PA | PA12 | PA12 | PA12 | PA12 | PA12 | PA12 |
| Chain limiter | AA (example not in accordance with the invention) | IA (example not in accordance with the invention) | NaSIP | NaSIP | NaSIP | NaSIP |
| Mn PA | 1500 | 1500 | 1500 | 2500 | 4000 | 600 |
| Mn PEG | 1500 | 1500 | 1500 | 1500 | 1500 | 600 |
| Catalyst | zirconium butoxide | zirconium butoxide | zirconium butoxide | zirconium butoxide | zirconium butoxide | zirconium butoxide |
| Transverse resistivity (ohm.cm) Standard: IEC93 | 3.5 E+09 | 3.7 E+10 | 1.3 E+08 | 4.4 E+08 | 1.5 E+09 | 6 E+08 |
| Surface resistivity (ohm/□) Standard: IEC93 | 4.0 E+10 | 1.5 E+13 | 2.4 E+10 | 5.6 E+10 | 5.6 E+11 | 5 E+10 |

AA: adipic acid
IA: isophthalic acid
NaSIP: sodium salt of sulphoisophthalic acid To simplify the writing of the examples, Example 7 is described before Example 6.

Example 7

Synthesis of an NaSIP-limited Polyetheresteramide: 6/11/6.12/PEG.NaSIP of Weight Proportions 24.5/24.5/21/30

147 g of caprolactam, 147 g of undecanoic acid, 42.2 g of hexamethylenediamine and 83.8 g of dodecanedioic acid are introduced into a 1 liter reactor, along with a solution of 55.6 g of NaSIP in 190.2 g of demineralized water.

The mixture is placed under an inert atmosphere and heated until the temperature reaches 230° C., maintaining vigorous stirring once the reagents melt, for 2 h. Next, the temperature is raised to 260° C. over one hour. Working at atmospheric pressure, the water which evaporates from the reaction mixture is continually distilled off. While flushing with nitrogen and at T=245° C., a solution of 124.4 g of polyethylene glycol of Mn=600 g/mol and 1.05 g of a solution of zirconyl acetate in water/acetic acid (0.625% total charge of zirconyl acetate; pH=3.0–3.5) is introduced.

The mixture obtained is placed under reduced pressure of about 5 mbar. The reaction is continued for a period of 2 hours. The product obtained has an inherent viscosity equal to 0.80 dl/g; melting point (determined optically): 105–115° C.

Example 6

The process is performed as in Example 7, but without using NaSIP.

Examples 8 and 9

The process is performed as in Example 7, but modifying the catalyst and/or the proportion of NaSIP and/or the proportion of PEG.

TABLE 2

Composition and resistivity of Examples 6–9 polyetheresteramide limited with NaSIP

| Example | 6 (comparative) | 7<br>21.4% by weigth PEG600 | 8<br>21.4% by weight PEG600 | 9<br>40.5% by weight PEG1500 |
|---|---|---|---|---|
| | 23.1% by weight PEG600 | | | |
| Block-PA | PA 6/11/6.12 | PA 6/11/6.12/6.NaSIP | PA 6/11/6.12/6.NaSIP | PA 6/11/6.12/6.NaSIP |
| NaSIP (% by weight) | 0 | 9.4 | 9.4 | 7.1 |
| Mn PA | 2000 | 2200 | 2200 | 2200 |
| Mn PEG | 600 | 600 | 600 | 1500 |
| Catalyst | zirconium butoxide | zirconyl acetate | zirconium butoxide | zirconium butoxide |
| Transverse resistivity (ohm.cm) Standard: EIC93 | 7.2 E+10 | 3.2 E+07 | 5.1 E+07 | 1.2 E+08 |
| Superficial resistivity (ohm) Standard: IEC93 | 2.1 E+13 | 1.2 E+10 | 3.9 E+10 | 1.3 E+10 |

NaSIP: sodium salt of sulphoisophthalic acid

What is claimed is:

1. Polyetheresteramides (B) containing polyamide blocks comprising condensing dicarboxylic acid sulphonates either as chain limiters for the polyamide block or with a diamine as one of the constituent monomers of the polyamide block wherein a polyamide sequence comprises oligomers made by condensing one or more α,ω-aminocarboxylic acids and/or of one or more lactams containing from 6 to 12 carbon atoms in the presence of a dicarboxylic acid sulphonate and optionally of a dicarboxylic acid containing from 4 to 12 carbon atoms, and the oligomers are of molecular mass $\overline{Mn}$ between 400 and 900, and containing polyether blocks consisting essentially of alkylene oxide units.

2. Polyetheresteramides (B) according to claim 1, in which the polyamide sequences result from the condensation of at least one α,ω-aminocarboxylic acid (or a lactam), at least one diamine and at least one dicarboxylic acid, and such that the chain limiter can be an excess of the dicarboxylic acid or another dicarboxylic acid, all or some of the chain limiter being replaced with a dicarboxylic acid sulphonate.

3. Polyetheresteramides (B) according to claim 2, in which the amount of dicarboxylic acid sulphonate is greater than the amount required as chain limiter and replaces all or some of the dicarboxylic acids used in combination with the diamine to constitute the polyamide block.

4. Polyetheresteramides (B) containing (i) polyamide blocks of the polyamide oligomer type of molecular masses $\overline{Mn}$ between 400 and 900 or of the copolyamide type, these polyamide blocks comprising condensing dicarboxylic acid sulphonates and containing (ii) polyether blocks which are adducts of alkylene oxide with an aromatic diol.

5. Antistatic or breathable polymer compositions comprising a thermoplastic polymer (A) and at least one polyetheresteramide (B) according claim 1.

6. Compositions according to claim 5, in which the thermoplastic polymer (A) is chosen from polyolefins, polyamides, fluorinated polymers, saturated polyesters, polycarbonate, styrene resins, PMMA, thermoplastic polyurethanes (TPU), PVC, copolymers of ethylene and of vinyl acetate (EVA), copolymers of ethylene and of an alkyl (meth)acrylate, ABS, SAN, polyacetal and polyketones.

7. Anistatic or breathable polymer compositions comprising a thermoplastic polymer (A) and at least one polyetheresteramide (B) according to claim 2.

8. Antistatic or breathable polymer compositions comprising a thermoplastic polymer (A) and at least one polyetheresteramide (B) according to claim 3.

9. Antistatic or breathable polymer compositions comprising a thermoplastic polymer (A) and at least one polyetheresteramide (B) according to claim 4.

10. Compositions according to claim 7, in which the thermoplastic polymer (A) is chosen from polyolefins, polyamides, fluorinated polymers, saturated polyesters, polycarbonate, styrene resins, PMMA, thermoplastic polyurethanes (TPU), PVC, copolymers of ethylene and of vinyl acetate (EVA), copolymers of ethylene and of an alkyl(meth) acrylate, ABS, SAN, polyacetal and polyketones.

11. Compositions according to claim 8, in which the thermoplastic polymer (A) is chosen from polyolefins, polyamides, fluorinated polymers, saturated polyesters, polycarbonate, styrene resins, PMMA, thermoplastic polyurethanes (TPU), PVC, copolymers of ethylene and of vinyl acetate (EVA), copolymerss of ethylene and of an alkyl (meth)acrylate, ABS, SAN, polyacetal and polyketones.

12. Compositions according to claim 9, in which the thermoplastic polymer (A) is chosen from polyolefins, polyamides, fluorinated polymers, saturated polyesters, polycarbonate, styrene resins, PMMA, thermoplastic polyurethanes (TPU), PVC, copolymers of ethylene and of vinyl acetate (EVA), copolymers of ethylene and of an alkyl(meth) acrylate, ABS, SAN, polyacetal and polyketones.

* * * * *